Aug. 18, 1964 H. D. CRANE 3,145,367

CHARACTER RECOGNITION CIRCUIT

Filed July 27, 1959 2 Sheets-Sheet 1

| | | | | | | | |
|---|---|---|---|---|---|---|---|
| 1 | | | 24 | 22 | S | 21 | S |
| 2 | | 21 | 22 | 23 | 24 | 21 | S |
| 3 | 21 | 22 | 23 | 21 | 22 | 23 | S |
| 4 | | | | 24 | 23 | 21 | S |
| 5 | 22 | 21 | 22 | 23 | S | 21 | S |
| 6 | | 22 | 21 | 24 | 23 | 22 | S |
| 7 | | | | 24 | 21 | 22 | S |
| 8 | | | 23 | 22 | 23 | 24 | S |
| 9 | | 23 | 22 | 21 | 24 | 22 | S |
| 0 | | 23 | 22 | 21 | 24 | 23 | S |
| A | | | 24 | 22 | S | 23 | S |
| Z | | | | 21 | 22 | 21 | S |

INVENTOR
HEWITT D. CRANE
BY Lyon & Lyon
ATTORNEYS.

Aug. 18, 1964 H. D. CRANE 3,145,367

CHARACTER RECOGNITION CIRCUIT

Filed July 27, 1959 2 Sheets-Sheet 2

INVENTOR.
HEWITT D. CRANE
BY Lyon & Lyon
ATTORNEYS.

United States Patent Office
3,145,367
Patented Aug. 18, 1964

3,145,367

CHARACTER RECOGNITION CIRCUIT

Hewitt D. Crane, Palo Alto, Calif., assignor to Stanford Research Institute, Palo Alto, Calif., a corporation of California Filed July 27, 1959, Ser. No. 829,639
6 Claims. (Cl. 340—146.3)

This invention relates to arrangements for recognizing written characters and, more particularly, to a system for recognizing such characters as they are being written.

There have been developed a number of systems for the automatic processing of data. These systems find extensive use in businesses where large amounts of data are received and must be processed. Illustrative of such businesses are insurance companies, merchandising firms, and passenger transportation, such as airlines or the railroads. Once data is entered into these machines, the processing thereof is extremely rapid. However, the problem still remains of entering the raw data into the machine on somewhat the same order of speed as the data is received or manufactured. To that end, character recognition systems are being developed which are employed to scan typewritten documents, recognize the characters thereon, and produce a unique electrical signal pattern representative of each different character.

Some attempts have been made to devise character recognition systems which function to provide electrical signals representative of a character as the character is written by hand. One such arrangement divides an area, on which numbers are to be written, into zones with conductive separation between zones. A unique conductive pattern results when a number is written with a conductive pencil, whereby character recognition may be effectuated. This, however, restricts the location where such writing takes place and requires special treatment of the writing surface.

An object of the present invention is to provide a unique arrangement for affording recognition of a character as it is being written.

Another object of the present invention is to provide a novel and simple arrangement for recognizing a written character.

Still another object of the present invention is to provide a unique arrangement for affording recognition of a character which is written on any writing surface.

Yet another object of the present invention is the provision of a novel transducer, whereby writing motions are converted into a unique signal sequence pattern whereby a character which has been written may be identified.

These and other objects of the invention are achieved in an arrangement whereby a transducer comprises a writing instrument which includes a plurality of contacts and a common contact. As the writing instrument is moved, in the course of writing a character, the common contact will be brought in contact with different ones of the plurality of contacts in an order which is unique for each different character. Each one of the contacts is associated with a different signal generator which is energized when that contact connects with the common contact. A recognition circuit is provided for each character to be recognized. The ones of the signal generators which are energized by the writing of a character are connected to the recognition circuit associated with that character.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
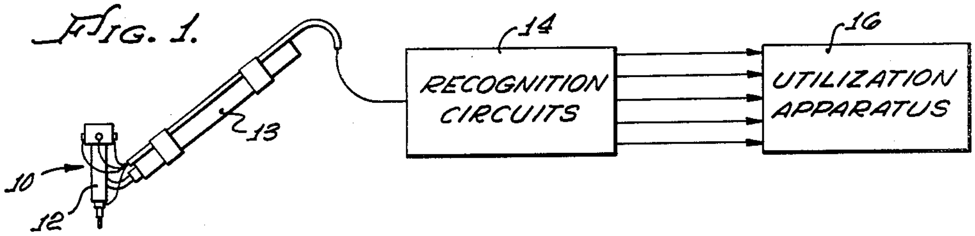
FIGURE 1 is a block diagram of an embodiment of the invention.

Reference is now made to FIGURE 1, wherein is shown a block diagram of an embodiment of the invention. This will simply include a transducer 10, which comprises a writing instrument. The writing part 12 of the writing instrument resembles the commonly known ball-point pen. There is also provided a hand-holding part 13, which is attached to the writing part 12. This insures that the writing part is always properly oriented when used. The hand-holding part 13 is grasped between the fingers, and writing can then be performed in the usual manner.

The writing instrument 10 will include an arrangement for closing each of a plurality of contacts in a different sequence for each different character. Wiring is brought out from each of these contacts to the recognition circuits 14. These circuits identify a character from the unique pattern of contact closures which results when that character is written. The output of the recognition circuits 14 is then applied to utilization apparatus 16. This may comprise either information-handling apparatus or punched tape or magnetic tape, upon which the recognition signals are recorded for subsequent entry into a data-handling system.

Figure 2:
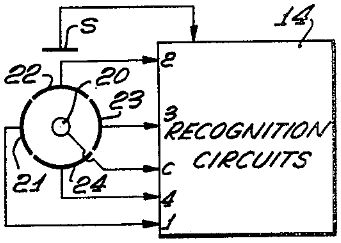
FIGURE 2 is a circuit diagram of the embodiment of the invention.
Figure 3:
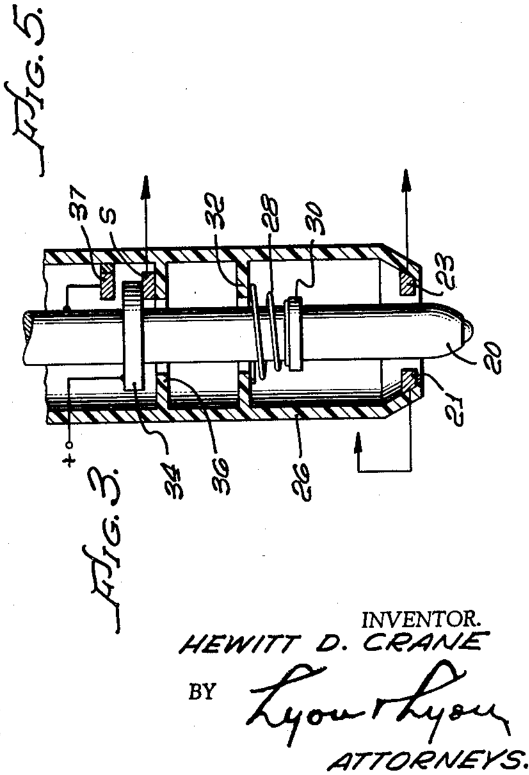
FIGURE 3 is a section of the transducer employed as a writing instrument in the embodiment of the invention.

Referring to FIGURE 2, there may be seen a circuit diagram of the contact arrangement which is provided within the writing instrument 10 for uniquely identifying each character. This will include a common contact 20, which in the embodiment of the invention may preferably be the elongated barrel made of conductive material, which holds the ink and at one end holds the writing point. This may better be seen in the cross section of the writing-instrument barrel 10, which is shown in FIGURE 3. A plurality of contacts 21, 22, 23, and 24 are mounted on the inside wall of the barrel 26, which is used to hold the elongated writing cartridge serving as a common contact. The contacts 21 through 24 may be made of plated areas on the inside of the barrel, brought out to the top thereof, or may actually be metal contacts which are inserted in holes drilled through the barrel. In any event, these contacts are spaced around the central common contact 20 at a position where, when writing occurs, the writing cartridge moves against the wall of the barrel to make a connection with one of the surrounding contacts. The contact with which it makes connection is determined by the direction of motion which the writing instrument takes in writing the character. The elongated writing cartridge 20 is supported in a manner to effectively pivot within the barrel as said writing takes place.

Looking at FIGURE 2, which effectively may comprise a plan view of the contact layout, as the writing instrument is moved in an upward direction, toward the top of the drawing, the common contact 20 will connect with the contact 24. A reverse motion, or downward motion, makes the common contact 20 connect with contact 22. A right-hand motion of the writing instrument will bring the common contact 20 in connection with contact 21. A left-hand stroke with the writing instrument will bring the common contact 20 in connection with contact 23. The size of the contacts 21, 22, 23, and 24 may be made equal or, if desired, may be varied to secure preferred contact closures for pen strokes occurring in certain directions.

In addition to the four contacts mentioned, another contact which is designated by the letter "S" is provided on the inside of the barrel, or retaining cylinder of the pen. The spring 28 pushes down and centers the writing cartridge by the well-known expedient of having one end encircling a crimped portion 30 of the cartridge and the other end held by an inward extending portion 32 of the cylinder 26. A conductive collar 34, which is insulated from the writing cartridge, fits above another inward extension 36 of the cylinder. An energizing contact 37 is supported to extend inwardly of the cylinder 26. Energizing potential is connected to the collar 34. The cartridge 20 is connected to the contact 37. The cartridge 20, however, is not placed in the energized circuit until the writing instrument is pushed against the paper, whereupon the collar 34 contacts contact 37. When the writing instrument is lifted from the paper, the spring 28 centers the cartridge and moves it outward in the direction of its writing end. This brings the collar 34 in contact with the contact "S." When the cartridge is brought down upon writing paper, the spring is compressed sufficiently to break the connection between the collar 34 and the contact "S" and to make the collar connect with contact 37. The manner of support shown in FIGURE 3 enables the cartridge to move as described in connection with FIGURE 2 to make contact with any one of the contacts 21 through 24 when used, but out of contact when not used.

Figure 4:
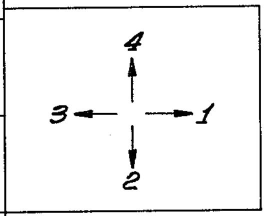
FIGURE 4 is a chart showing the logic involved in the operation of the embodiment of the invention.

FIGURE 4 shows, by way of illustration, the sequence of contacts which are closed in writing the numeric characters 1 through 0 and the alphabetic characters A and Z. Motion in the upward vertical direction is indicated as 4; motion in the downward vertical direction is indicated as 2; motion in the left horizontal direction is indicated as 3; and motion in the right horizontal direction is indicated as 1. It should be here noted that more than four contacts plus the "S" contact may be employed for detecting direction of motion, if desired. Also, other contact sequences than the ones shown may be derived, depending on how a character is written. Thus, this should not be construed as a limitation upon the invention, but merely exemplary of the principles thereof. In the writing of the characters shown in FIGURE 4, these will be commenced at the point indicated in each instance by an arrowhead. Thus, for writing a one, first motion occurs in direction 4, next motion occurs in direction 2, then the end may be lifted from the paper to draw the bottom of the 1. As soon as the pen is lifted, the contact "S" is made. Thereafter, a motion occurs in direction 1, followed by the closure of the "S" contact to the common contact again. Thus, this sequence of motions, which occurs in writing the numeral 1, results in the common contact successively making connection with contacts 24, 22, the "S" contact, then contact 21. Thereafter, the "S" contact is closed again as the pen is lifted from the paper.

Using the same analysis for the number 2, when motion is commenced at the point indicated the motion sequence will be 1, 2, 3, 4, 1. This may be represented by the contact sequence 21, 22, 23, 24, 21, S.

The analysis indicated may be made for all numbers, as shown in FIGURE 4, with the contact closures which follow being set out in the table. The letter A provides a contact closure sequence 24, 22, S, 23, S. The letter Z provides a contact closure sequence 21, 22, 21, S. Upon further analysis of the contact sequences resulting from the motion of the writing instrument to write the vairous numbers, it is found that some of the numbers may be uniquely identified by a number of contact closures which are fewer than those actually provided. Thus, those to the left of the heavy line drawn through the chart may be disregarded in the construction of the recognition circuit for each number, as will be described subsequently herein.

Figure 5:
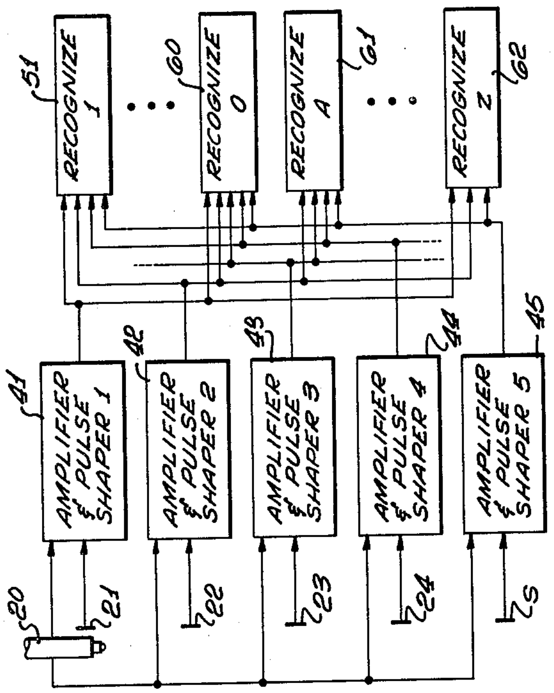
FIGURE 5 is a block diagram of the recognizing portion of the embodiment of the invention.

FIGURE 5 is a block diagram of the recognition portion of the invention. The writing cartridge 20, which is a common contact, is connected to each one of a plurality of amplifiers and pulse shapers 41, 42, 43, 44, and 45. These respectively have also connected the contacts 21, 22, 23, 24, and S. Thus, each time the common contact connects to one of the other contacts, the associated amplifier and pulse shaper emits a single pulse, regardless of how long connection is maintained. Suitable circuits for performing this operation are well known and can be, for example, a Schmitt trigger circuit or a single-shot multivibrator, or even a blocking oscillator.

When a sequence of contact connections is made by the common contact in response to the writing of a character, the amplifiers and pulse shapers associated with the respective contacts will present a unique sequence of pulses. It will be appreciated that the unique sequence of pulses is associated with and identifies a character which is being written. For each character desired to be recognized, a different recognize circuit 51 through 60, 61, 62 is provided. Thus, the recognize circuit 51 will recognize the pulse sequence provided when the number 1 is written and can emit a signal to subsequent apparatus, not shown, which can utilize the identification signal. Recognize apparatus 60 will recognize a 0 from the pulse sequence presented to its input and can energize utilization apparatus with its output. Similarly, the recognize apparatus 61 will recognize the letter A from the sequence of pulses applied to its input, and the recognize apparatus 62 will recognize the Z from the sequence of pulses applied to its input. For emphasis it should be appreciated that one recognize circuit is provided for each different character to be recognized, and the rectangles 51, 60, 61, 62 merely exemplify this fact. The inputs to recognize circuit 51 will comprise the outputs of those amplifiers and pulse shapers 44, 42, 41, 45, which are energized when a 1 is written—similarly, for all other recognize circuits. The input connections to these other recognize circuits comprise the outputs of only those of the amplifiers and pulse shapers 41 through 45 which are energized when the writing transducer is moved to write the character associated with the recognize circuit.

Figure 6:
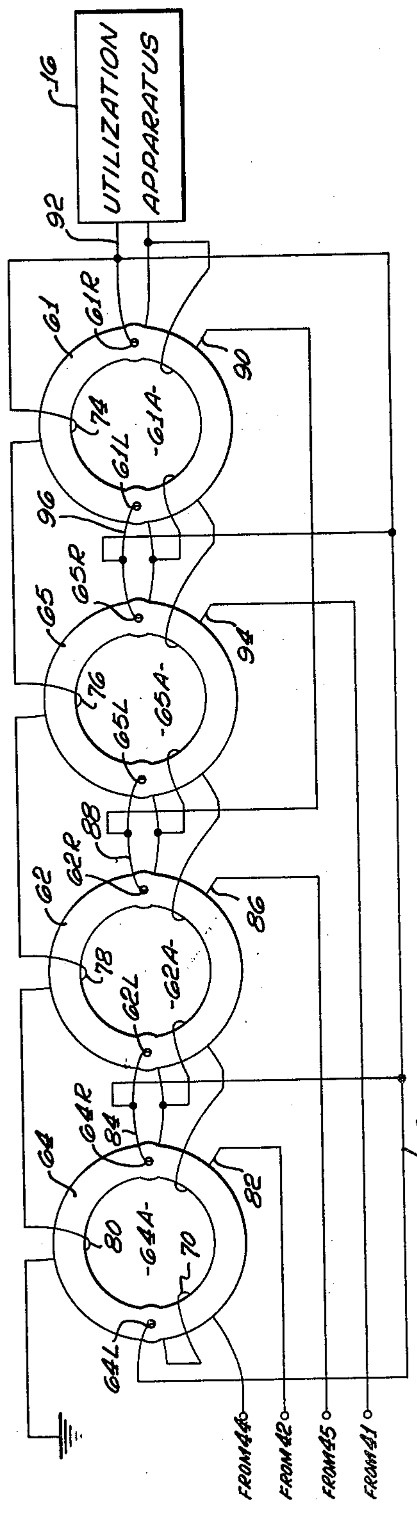
FIGURE 6 is a circuit diagram illustrative of a suitable recognition circuit which may be employed in the embodiment of the invention.

In an application for a Logical System, by this inventor, which was filed August 18, 1958, and bears Serial No. 755,742, now Patent No. 3,056,116, there is described circuitry which may be employed for performing the function of recognizing or identifying a character from a unique sequence of pulses generated by a writing instrument which is writing that character. The recognition circuit will comprise bistable state elements, each one of which is associated with a pulse in the unique sequence of pulses and all of which are arranged in the same sequence as the unique sequence of pulses. FIGURE 6 illustrates, by way of example, a circuit diagram of a suitable logical circuit which is one of the type described in the aforesaid application. Assume for the purposes of explanation of the operation of the sequence detector that it is desired to detect or recognize the occurrence of the number 1. Referring to the chart, it is seen that in order to recognize when the number 1 is written, contacts 24, 22, S, 21, S, are closed, whereby amplifiers 44, 42, 45, 41, and 45 again are activated, in the sequence just recited, to provide pulses. In the recognition circuit in FIGURE 6, multiapertured magnetic ferrite cores are shown, respecively bearing reference numerals 64, 62, 65, and 61, in order to show association with the aforementioned amplifiers and pulse shapers.

The theory of operation of a multiaperture core in an array wherein binary information is entered into a first core and then transferred successively to succeeding cores is well known and may be found described, for example, in an article by H. D. Crane, entitled "Logic System Using Magnetic Elements and Connecting Wire Only," in the Proceedings of the I.R.E., vol. 47, pp. 63–73, January 1959. Briefly, the binary information may be entered into a core by exciting a winding which passes through one of the smaller apertures of the core. The current which is employed to enter a 1 into a core which is in its clear condition must exceed a threshold value. If it does not exceed this threshold value, then the core will remain substantially unaffected. Should a 1 have been entered into a core, then upon the application of a current to a winding which passes through the transmit aperture in the core, the fact that a 1 has been entered into that core can be detected. The cores can be reset by applying a current having a sufficient amplitude to a winding which passes through their main apertures.

Referring now again to FIGURE 6, each core 64, 62, 65, 61, has a main central aperture 64A, 62A, 65A, 61A, and two small apertures, respectively 64L, 64R, 62L, 62R, 65L, 65R, 61L, 61R. The output from the amplifier and pulse shaper 44 is applied to a winding 70, which threads through the main aperture 64A of the core 64, then through the aperture 64L. Thereafter, it connects with a line 72. The line 72, in turn, is connected to a plurality of clear windings 74, 76, 78, 80, which are connected in series. Each of these clear windings couples to the main aperture of the respective cores. The sense of the winding 70 is such that a current passing therethrough will oppose the clear action provided by a current passing through the clear winding 80. Thus, the winding 70, which passes through the main aperture, is considered as a bucking coil, which bucks the operation of the clear coil.

The output of the amplifier and pulse shaper 42 is applied to a winding 82, which includes a bucking section passing through the main aperture of the core 64, a second bucking section passing through the main aperture of the core 62, and thereafter connecting to one side of a coupling winding 84. The other side of the coupling winding 84 is connected to the line 72. Coupling winding 84 is a closed-loop winding, which passes through the apertures 64R, 62L and serves the function of transferring binary data from the core 64 to the core 62.

The output of the amplifier and pulse shaper 45 is applied to a coil 86, which includes a bucking portion passing through the main aperture of the core 62, and thereafter a second bucking portion passing through the main aperture of the core 65, and thereafter connecting to one side of the coupling winding 88. The other side of the coupling winding 88 is connected to another bucking winding 90, which passes through the main aperture of core 61, and thereafter connects to an output transfer winding 92.

The output of amplifier and pulse shaper 41 is connected to a coil 94, which includes a first bucking winding coupled to core 65 through its main aperature 65A and a second bucking winding coupled to the core 61 through its main aperture 61A. The bucking winding 94 is then connected to one side of the coupling winding 96. This coupling winding couples the apertures 65R to aperture 61L. The other side of the coupling winding 96 is connected to the line 72. Likewise, the other sides of coupling winding 92 is connected to the line 72. Coupling winding 92 is connected to the utilization apparatus 16.

The operation of the recognition circuit shown in FIGURE 6 is as follows. Whenever a pulse is received from the amplifier and pulse shaper 44, this applies a current to the winding 70, which flows through the aperture 64L, whereby the magnetic core 64 may be driven to its 1, or set, condition. The current in the winding 70 also is connected to the line 72, and thereafter through the sereis of clear windings 74, 76, 78, and 80. Thus, the cores 62, 65, and 61 may be driven to their clear condition; however, core 64 is not driven to its clear condition, in view of the fact that the bucking winding portion of the coil 70 opposes the action of the clear winding 80.

After the receipt of the output pulse from the amplifier and pulse shaper 44, should an output pulse be received from amplifiers and pulse shapers 45 or 41 next, instead of from amplifier and pulse shaper 42, core 64 would be driven to its clear state by virtue of the connection of the outputs of these amplifiers and pulse shapers to the clear winding 80. No transfer of information occurs from the core 64, since the coupling winding 84 is not excited when amplifier and pulse shapers 45 and 41 are excited.

If amplifier and pulse shaper 42 is excited after amplifier and pulse shaper 44, then winding 82 sets up a bucking action in cores 64 and 62 and applies a current to the coupling winding 84. Core 64 is driven by the current in the coupling winding to provide an indication of the fact that a 1 has been detected therein and the current in the coupling winding 84 is steered through the aperture 62L whereby the amplitude of this current exceeds that required to enter a 1 into core 62. Current flows into the winding 84 and out from the winding 84 along the line 72 and then through the series of clear windings on all the cores. However, in view of the excitation of the bucking portions of winding 82, cores 64 and 62 are not affected by the operation of the clear winding.

Should any one of the amplifier and pulse shapers other than 45 be next excited, the cores will all be reset to their clear state. However, should the amplifier and pulse shaper 45 next be excited, then a pulse of current is applied to winding 86, whereby cores 62 and 65 will not be cleared by operation of their clear windings 76 and 78, and a 1 will be transferred from core 62 to core 65 by the current which flows through the coupling winding 88.

The current from the output of the amplifier and pulse shaper 45 effectuates a transfer of a 1 from core 62 to core 65, if core 62 has had a 1 entered therein. If not, then the current in the winding 88, due to this pulse, does not exceed the threshold value required to affect either core 62 or 65, and they will be left in their clear condition. The output of amplifier and pulse shaper 45 is also applied to the coil 90. Should core 61 have had a 1 entered thereinto previously, then current in the coil 90 would effectuate a transfer out from core 61 of this information. Otherwise, the current applied to winding 90 passes through the transfer coil 92 and thereafter through the clear coils 74, 76, 78, 80. However, the only core that is cleared by this current is core 64, since cores 62, 65, and 61 have bucking windings thereon which are excited by this current.

After amplifier and pulse shaper 45 has been excited, then, unless the subsequent amplifier and pulse shaper 41 is energized, no further information can be transferred, and the cores can be driven back to their clear condition. The energization of amplifier and pulse shaper 41 results in core 65 transferring the set condition to the core 61. Cores 65 and 61 are not affected by the operation of current in the clear windings, but cores 62 and 64 are cleared, if not already in this state.

The next operation required is the lifting of the writing instrument from the paper, since the writing of the 1 has been finished. This results in the condition of magnetic core 61 being detected and transferred to the utilization apparatus 16. As a result of the description, it is seen that the circuit shown in FIGURE 6 responds only to the unique pulse sequence which is generated when the character 1 is written. For any of the other characters illustrated, for example, in FIGURE 4, all that is required is a number of magnetic cores in accordance with the number of contacts or pulses which are obtained in the writing of the character. These are arranged in the manner shown in FIGURE 6, whereby the cores are each associated with an input obtained from an amplifier and pulse shaper output. The cores are arranged in the sequence in which these inputs are to be obtained; thereafter, only that sequence results in a successful transfer of a 1 from the first core out of the last core. Any other sequence causes the cores to be cleared, whereupon the sequence required for success must be started over again.

There has been accordingly shown and described herein a novel and useful system for recognizing a character being written and providing an indication thereof which may be entered into information-handling machines directly or may be recorded magnetically or by punched holes for subsequent utilization. The system employs a novel transducer as a writing instrument. Although, in the description of the invention information is shown being derived from only five contacts, this is not to be construed as a limitation upon the invention. Obviously, the principles set forth herein are also applicable when it is desired to use an increased number of contacts, whereby more information for decoding the handwritten character than is provided with five contacts, may be obtained. Thus, the illustration of the invention is to be taken as exemplary, and not as limiting.

I claim:

1. A system for recognizing a character being written by a writing instrument on a writing medium comprising a plurality of signal-generating means, means for energizing a separate one of said signal-generating means for each different direction moved by said writing instrument while writing a character to establish a unique energization sequence of said signal-generating means for each character, a different recognition means for each character for providing a recognition signal responsive to receiving the outputs of the signal generators energized in the unique sequence for each said character, and means for applying to the recognition means for each character the outputs of the signal generators uniquely energized when said character is written.

2. A system for recognizing a character being written by a writing instrument on a writing medium comprising a writing instrument including a plurality of contacts and a common contact, means for supporting said common contact to make connection with a different one of said plurality of contacts for each direction of motion through which said writing instrument moves in the course of writing to provide a unique sequence of connections for each different character being written, a recognition means for each different character to generate a recognition signal responsive to the occurrence of the unique sequence for that character, and means to couple to each said recognition means said common contact and the ones of said plurality of contacts to which connection is made in said unique sequence.

3. A system as recited in claim 2 wherein said writing instrument includes a hollow barrel, an elongated writing cartridge having a conductive wall for forming a common contact, means for pivotably supporting said elongated writing cartridge within said hollow barrel, and a plurality of contacts spaced around the inside of said barrel wall adjacent said writing cartridge common contact.

4. A system for recognizing a character being written by a writing instrument on a writing medium comprising a writing instrument including a common contact and a plurality of contacts, means for yieldably supporting said common contact to make connection with a first one of said plurality of contacts when not writing and to make connection with a different one of said plurality of contacts when writing for each direction of motion through which said writing instrument moves in the course of writing to provide a unique sequence of contact connections for each different character being written, a plurality of signal generators to each of which a different one of said plurality of contacts is connected, means for energizing a signal generator when said common contact contacts the one of the plurality of contacts to which said signal generator is connected, for each character to be recognized a recognition means responsive to a unique sequence of signals for providing an output indicative of said character, and means for separately applying to each recognition means the outputs of those of the signal generators which are actuated when the unique sequence of connections is made by said writing instrument writing said character.

5. A system for recognizing a character being written as recited in claim 4 wherein each said recognition means includes a plurality of bistable state devices each being associated with a different signal in the unique sequence of signals to which said recognition means responds, all said bistable state devices being arranged in said unique sequence, each said bistable state device having a set stable state and a clear stable state, means for driving all said bistable state devices to their clear states responsive to signals from said signal generators, means responsive to the successive occurrence of signals from said signal generators in said unique sequence to successively drive each said associated bistable state device to its set state and to inhibit the clear state drive of the bistable state device associated with the concurrently occurring signal and the immediately preceding bistable state device.

6. A system as recited in claim 5 wherein each said bistable state device is a core of magnetic material having substantially rectangular hysteresis characteristics, said means for driving all said bistable state devices to their clear state includes a winding on each core, means for connecting all said windings in series, and means for applying current to said series-connected windings responsive to the occurrence of signals at said source.

References Cited in the file of this patent

UNITED STATES PATENTS

| | | |
|---|---|---|
| 2,446,392 | Rey | Aug. 3, 1948 |
| 2,992,408 | Eldredge et al. | July 11, 1961 |